(12) United States Patent
Kim

(10) Patent No.: US 10,703,353 B2
(45) Date of Patent: Jul. 7, 2020

(54) SYSTEM AND METHOD FOR CONTROLLING DRIVING OF HYBRID VEHICLE

(71) Applicants: Hyundai Motor Company, Seoul (KR); Kia Motors Corporation, Seoul (KR)

(72) Inventor: Do Hee Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 238 days.

(21) Appl. No.: 15/631,484

(22) Filed: Jun. 23, 2017

(65) Prior Publication Data

US 2018/0208174 A1   Jul. 26, 2018

(30) Foreign Application Priority Data

Jan. 23, 2017   (KR) .................. 10-2017-0010646

(51) Int. Cl.

| | |
|---|---|
| *B60W 20/10* | (2016.01) |
| *B60W 40/107* | (2012.01) |
| *B60W 10/08* | (2006.01) |
| *B60W 10/06* | (2006.01) |
| *B60W 20/12* | (2016.01) |
| *B60W 50/00* | (2006.01) |

(52) U.S. Cl.
CPC ............ *B60W 20/10* (2013.01); *B60W 10/06* (2013.01); *B60W 10/08* (2013.01); *B60W 20/12* (2016.01); *B60W 40/107* (2013.01); *B60W 50/0097* (2013.01); *B60W 2520/04* (2013.01); *B60W 2520/10* (2013.01); *B60W 2520/105* (2013.01); *B60W 2540/10* (2013.01); *B60W 2540/106* (2013.01); *B60W 2552/05* (2020.02); *B60W 2552/15* (2020.02); *B60W 2552/20* (2020.02); *B60W 2556/50* (2020.02)

(58) Field of Classification Search
CPC .......... B60W 20/10; B60W 2520/105; B60W 2540/106; B60W 2550/141; B60W 40/107
See application file for complete search history.

(56) References Cited

U.S. PATENT DOCUMENTS

| | | | | |
|---|---|---|---|---|
| 5,566,072 | A * | 10/1996 | Momose | B60T 8/174 |
| | | | | 701/117 |
| 10,272,909 | B1 * | 4/2019 | Melatti | B60L 58/12 |
| 2007/0199745 | A1 * | 8/2007 | Hayashi | B60K 6/48 |
| | | | | 180/65.28 |
| 2009/0150314 | A1 | 6/2009 | Engstrom et al. | |
| 2010/0312427 | A1 * | 12/2010 | Ueno | B60K 6/365 |
| | | | | 701/22 |
| 2012/0059539 | A1 * | 3/2012 | Arnett | B60L 15/20 |
| | | | | 701/22 |
| 2012/0199437 | A1 * | 8/2012 | Okuda | B60K 6/48 |
| | | | | 192/85.63 |

(Continued)

*Primary Examiner* — Donald J Wallace
(74) *Attorney, Agent, or Firm* — Mintz Levin Cohn Ferris Glovsky and Popeo, P.C.; Peter F. Corless

(57) ABSTRACT

A system and method for controlling driving of a hybrid vehicle are provided. The method includes determining whether acceleration of the hybrid vehicle is predicted and increasing a conversion reference value converting a driving mode of the hybrid vehicle from an electric vehicle (EV) mode to a hybrid electric vehicle (HEV) mode when acceleration of the hybrid vehicle is predicted.

14 Claims, 7 Drawing Sheets

(56) References Cited

U.S. PATENT DOCUMENTS

| | | | | |
|---|---|---|---|---|
| 2013/0124026 A1* | 5/2013 | Ueno | ............. | B60K 6/48 |
| | | | | 701/22 |
| 2014/0100730 A1* | 4/2014 | Park | ............. | B60W 10/06 |
| | | | | 701/22 |
| 2015/0314776 A1* | 11/2015 | Yu | ............. | B60W 20/40 |
| | | | | 701/22 |
| 2015/0314778 A1* | 11/2015 | Matsui | ............. | F02D 29/02 |
| | | | | 701/22 |
| 2015/0344025 A1* | 12/2015 | Park | ............. | B60K 6/48 |
| | | | | 701/22 |
| 2016/0185336 A1* | 6/2016 | Ueno | ............. | B60K 6/48 |
| | | | | 701/22 |
| 2016/0185337 A1* | 6/2016 | Morita | ............. | B60L 50/16 |
| | | | | 701/22 |
| 2016/0280213 A1* | 9/2016 | Lian | ............. | B60W 20/13 |
| 2016/0368479 A1* | 12/2016 | Kim | ............. | B60W 10/06 |
| 2017/0182998 A1* | 6/2017 | Hatsuda | ............. | B60W 30/18136 |
| 2019/0039600 A1* | 2/2019 | Hawley | ............. | B60K 6/48 |

* cited by examiner

SYSTEM AND METHOD FOR CONTROLLING DRIVING OF HYBRID VEHICLE

CROSS-REFERENCE TO RELATED APPLICATION

This application claims priority to and the benefit of Korean Patent Application No. 10-2017-0010646 filed in the Korean Intellectual Property Office on Jan. 23, 2017, the entire contents of which are incorporated herein by reference.

BACKGROUND

(a) Field of the Invention

The present invention relates to a control method and system for a vehicle, and more particularly, to a system and method for controlling driving of a hybrid vehicle to reduce unnecessary energy consumption.

(b) Description of the Related Art

An environmentally-friendly vehicle includes a fuel cell vehicle, an electric vehicle, a plug-in electric vehicle, and a hybrid vehicle, and typically includes a motor that generates driving force. A hybrid vehicle, which is an example of an environmentally-friendly vehicle, uses an internal combustion engine and power of a battery together to drive the vehicle. In other words, the hybrid vehicle efficiently combines and uses power of the internal combustion engine and power of a motor. The hybrid vehicle includes an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle includes a hybrid control unit (HCU) configured to operate the hybrid vehicle, an engine control unit (ECU) configured to operate the engine, a motor control unit (MCU) configured to operate the motor, a transmission control unit (TCU) configured to operate the transmission, and a battery control unit (BCU) configured to operate and manage the battery. The battery control unit may be referred to as a battery management system (BMS). The starter-generator may be referred to as an integrated starter and generator (ISG) or a hybrid starter and generator (HSG).

Further, the hybrid vehicle may be driven in various driving modes, such as an electric vehicle (EV) mode, which is an electric vehicle mode using power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery. A technology of the related art classifies driving environments according to driving information of a vehicle to vary driving control of the vehicle. The related art may collect the vehicle data having driver characteristics to predict current driving environment and to adjust the vehicle performance based on the predicted or detected driving environment.

The above information disclosed in this section is merely for enhancement of understanding of the background of the invention and therefore it may contain information that does not form the prior art that is already known in this country to a person of ordinary skill in the art.

SUMMARY

The present invention provides a method for controlling driving of a hybrid vehicle which is capable of reducing unnecessary energy consumption on a real road using a control logic for predicting an acceleration state of the vehicle to prevent an unnecessary switching (e.g., an on state of an engine) from an electric vehicle (EV) mode to a hybrid electric vehicle (HEV) mode.

An exemplary embodiment of the present invention provides a method for controlling driving of the hybrid vehicle that may include: determining, by a controller, whether acceleration of the hybrid vehicle is predicted; and increasing, by the controller, a conversion reference value that converts a driving mode of the hybrid vehicle from an electric vehicle (EV) mode to a hybrid electric vehicle (HEV) mode when acceleration of the hybrid vehicle is predicted.

The controller may be configured to determine whether acceleration of the hybrid vehicle is predicted based on a change rate of speed of the vehicle and a change rate of an acceleration pedal position sensor (APS) value generated during a predetermined driving time after the hybrid vehicle stops or decelerates to a predetermined speed. The method may further include: determining, by the controller, whether a slope of a road on which the vehicle is traveling is less than or equal to a threshold value. The controller may be configured to predict acceleration of the vehicle when the slope is less than or equal to the threshold value.

Additionally, the method may include: determining, by the controller, a type of a road on which the vehicle is traveling based on an average speed of the vehicle. The controller may be configured to predict acceleration of the vehicle when the type of the road is determined as a street in a downtown. The method may further include: determining, by the controller, a type of a road on which the vehicle is traveling based on an average speed of the vehicle. The controller may be configured to predict acceleration of the vehicle when the type of the road is determined as an expressway.

Further, the controller may be configured to determine whether acceleration of the hybrid vehicle is predicted based on traffic signal information or precision map information received by the vehicle. The method may further include: determining, by the controller, a type of a road on which the vehicle is traveling based on precision map information. The controller may be configured to predict acceleration of the vehicle when the type of the road is determined as a street in a downtown.

The method for controlling driving of the hybrid vehicle may further include: determining, by the controller, a type of a road on which the vehicle is traveling based on precision map information. The controller may be configured to predict acceleration of the vehicle when the type of the road is determined as an expressway. The vehicle may be operated by the controller to travel in the EV mode after the conversion reference value is increased. The method for controlling driving of the hybrid vehicle according to the exemplary embodiment of the present invention may increase fuel efficiency of the vehicle using driving information (or a driving pattern) of the vehicle.

The exemplary embodiment of the present invention may increase fuel efficiency by reducing an unnecessary on state of an engine in various acceleration situations occurring while the vehicle is being driven. Further, the exemplary embodiment of the present invention may reduce fuel consumption due to an acceleration pattern of the vehicle that has a substantial effect on fuel consumption. Thus, fuel consumption caused by a driver who aggressively starts the vehicle may be reduced and fuel efficiency deviation according to the driver may be reduced.

BRIEF DESCRIPTION OF THE DRAWINGS

A brief description of the drawings will be provided to more sufficiently understand the drawings which are used in the detailed description of the present invention.

DETAILED DESCRIPTION

Figure 1:
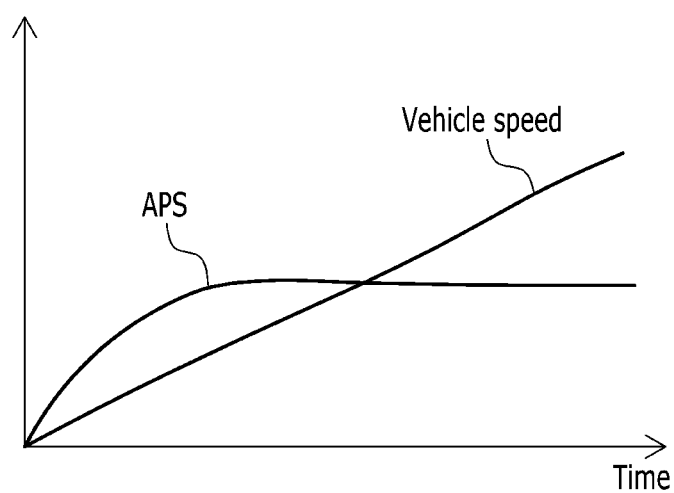
FIG. 1 is a graph illustrating a normal acceleration situation of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe specific exemplary embodiments rather than limiting the present invention. Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

In order for a vehicle to perform a high-efficiency energy-saving driving on a road (or a real road), energy consumption according to a repeated acceleration driving pattern of the vehicle needs to be managed. Since a method for classifying an ordinary driving pattern based on an average value of a vehicle speed or an average value of an acceleration pedal position sensor (APS) value according to related art uses all driving information, it may be difficult to classify (or extract) some distinguishing driving characteristics. In other words, since all the driving information is considered together in the related art, it may be difficult to extract driving characteristics therefrom. A response to a momentary driving event may be difficult due to a control based on a constant cycle according to the method. Therefore, there is a need to minimize energy consumption by appropriately classifying an acceleration driving pattern of the vehicle which causes a substantial amount of instantaneous fuel consumption and an unnecessary engine operation to adjust a conversion reference value switching from an electric vehicle (EV) mode to a hybrid electric vehicle (HEV) mode when acceleration of the vehicle is predicted or detected (e.g., detected by an acceleration sensor).

For a control based on determination of the driving pattern according to the related art, distinguishing driving information may disappear since ordinary driving tendency is extracted using driving information such as the vehicle speed. For example, a sudden deceleration of the vehicle after a sudden acceleration is the distinguishing driving information, but the distinguishing driving information may be removed in the process of calculating the average value for extracting the ordinary driving tendency. Therefore, there is a need for a method to improve driving efficiency of the vehicle using the distinguishing driving information.

The acceleration of the vehicle may be classified into two types as follows. One classification may be when the vehicle starts from a stop of the vehicle to accelerate and one when the vehicle accelerates after the vehicle decelerates for entering an interchange or passing a toll gate while the vehicle is being driven. The above classification may be again classified into an acceleration pattern (or an acceleration-travel pattern) on a street in a downtown and an acceleration pattern on an expressway.

Figure 2:
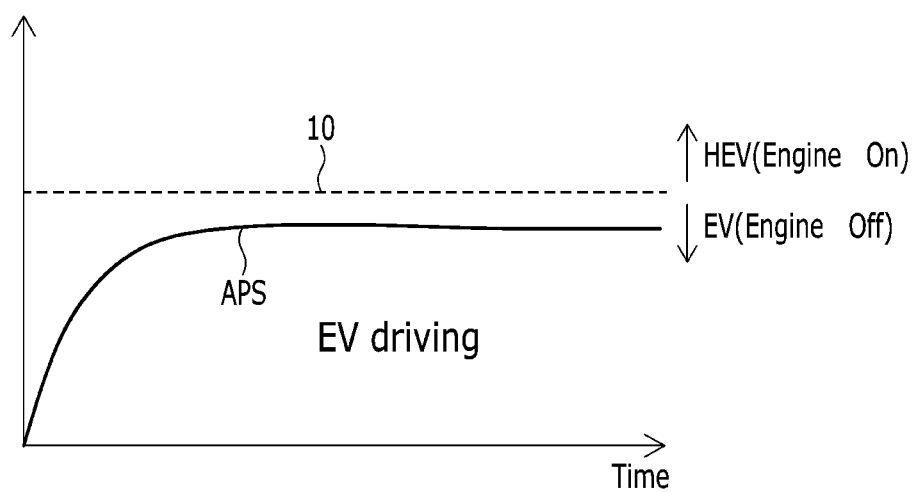
FIG. 2 is a graph illustrating a reference value switching from an electric vehicle (EV) mode shown in FIG. 1 to a hybrid electric vehicle (HEV) mode.

FIG. 1 is a graph illustrating a normal acceleration situation of a vehicle. FIG. 2 is a graph illustrating a reference value switching from the EV mode shown in FIG. 1 to the HEV mode. Referring to FIGS. 1 and 2, in the normal acceleration situation of the vehicle, the hybrid vehicle may travel in the EV mode which is an operation mode that is less than the reference value 10 when a state of charge (SOC) of a battery is greater than the reference value. The reference value 10 may be determined in advance by a test and is not limited thereto.

Figure 3:
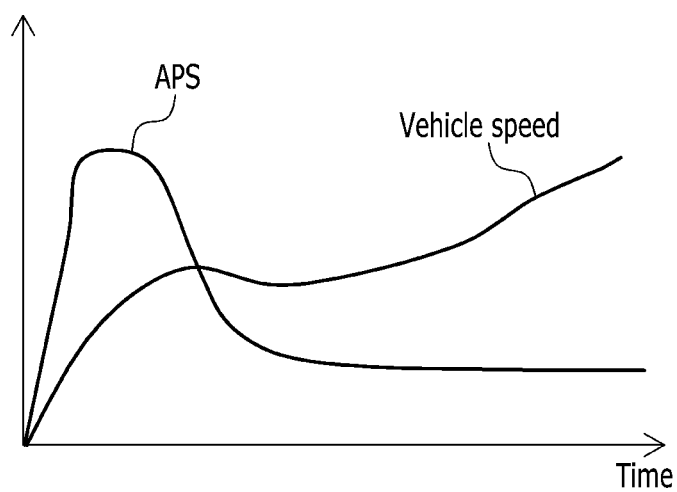
FIG. 3 is a graph illustrating a sudden acceleration situation where a fuel is ineffectively used in the vehicle.
Figure 4:
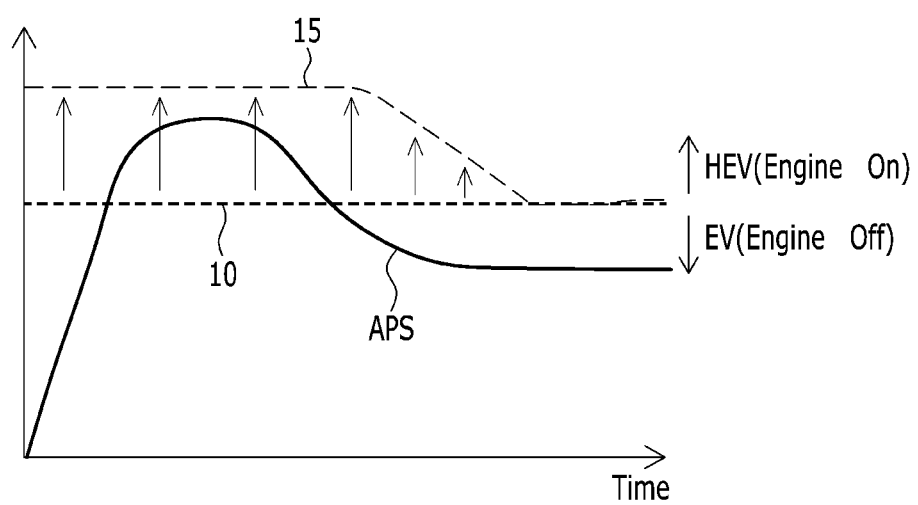
FIG. 4 is a graph illustrating a conversion reference value for switching from the EV mode shown in FIG. 3 to the HEV mode according to an exemplary embodiment of the present invention.
Figure 5:
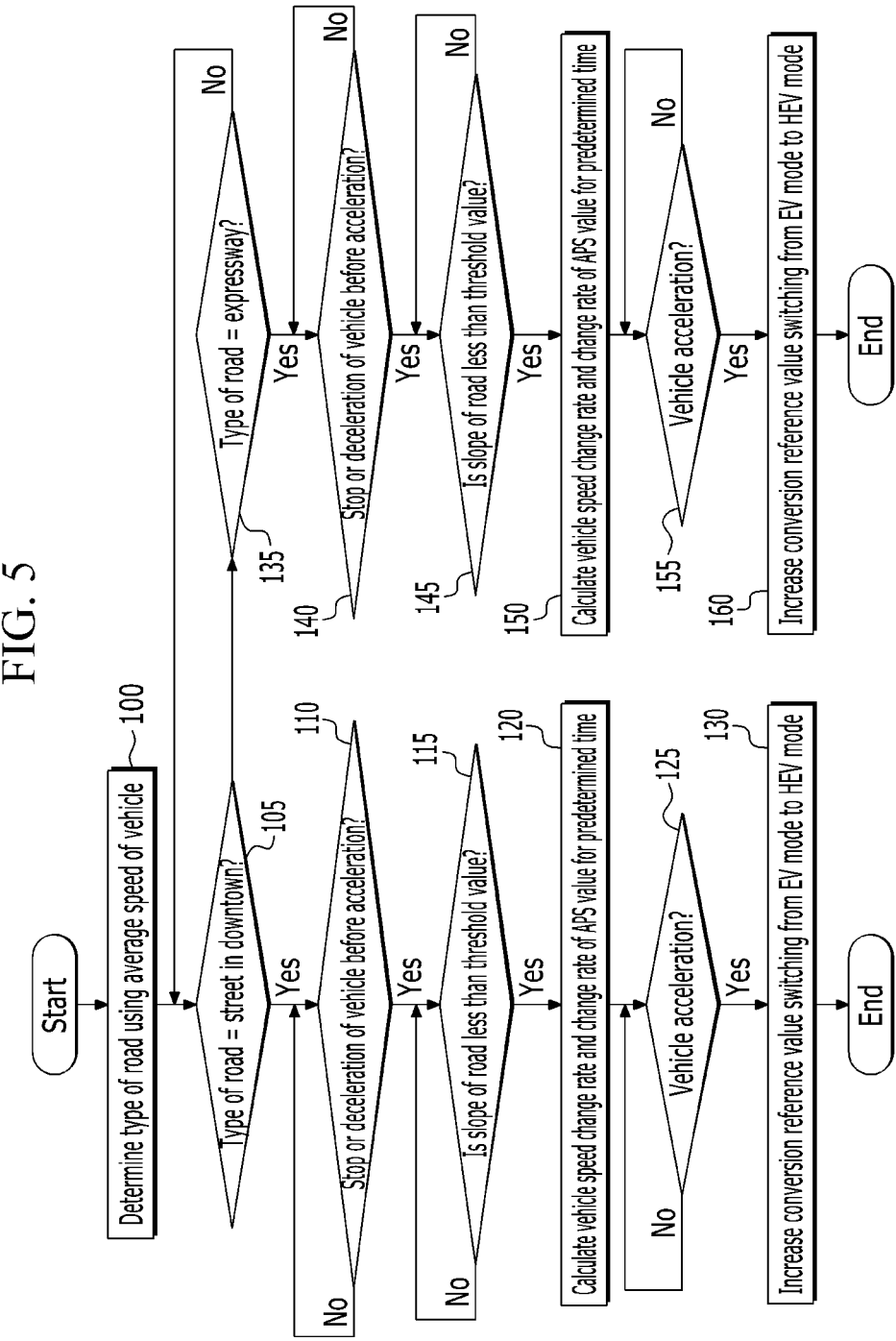
FIG. 5 is a flowchart illustrating a method for controlling driving of a hybrid vehicle according to an exemplary embodiment of the present invention.
Figure 7:
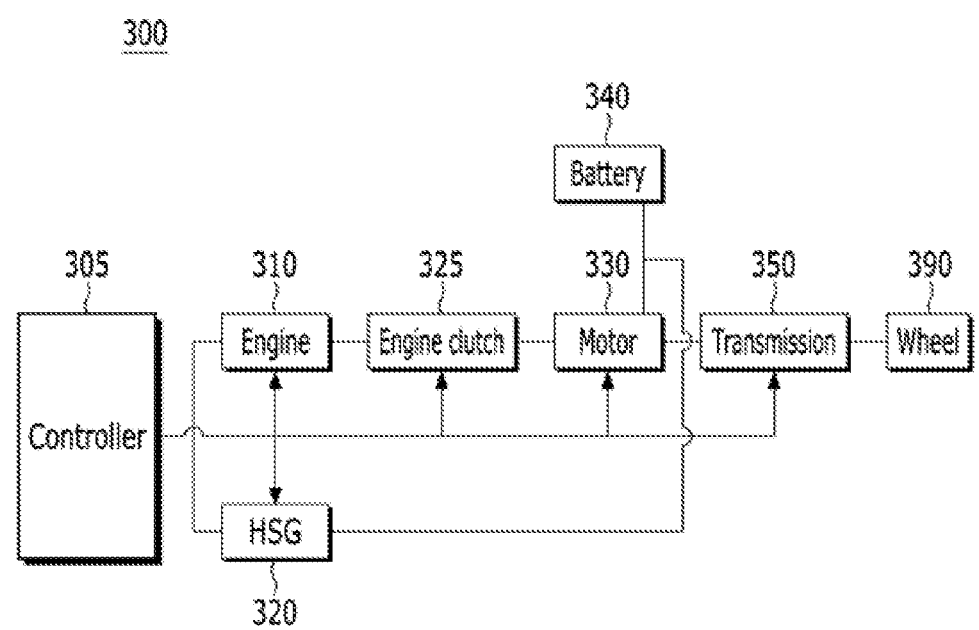
FIG. 7 is a block diagram illustrating the hybrid vehicle to which the method for controlling driving of the hybrid vehicle according to the exemplary embodiment of the present invention is applied.

FIG. 3 is a graph illustrating a sudden acceleration situation where a fuel is ineffectively used in the vehicle. FIG. 4 is a graph illustrating a conversion reference value for switching from the EV mode shown in FIG. 3 to the HEV mode according to an exemplary embodiment of the present invention. FIG. 5 is a flowchart illustrating a method for controlling driving of a hybrid vehicle according to an exemplary embodiment of the present invention. FIG. 7 is a block diagram illustrating the hybrid vehicle to which the method for controlling driving of the hybrid vehicle according to the exemplary embodiment of the present invention is applied. The method to be described herein below may be executed by a controller having a processor and a memory.

Referring to FIGS. 3, 4, 5, and 7, in a determination step 100, a controller 305 may be configured to determine a type of a road on which the hybrid vehicle 300 is being driven (e.g., is traveling) based on an average speed of the hybrid vehicle. In particular, the controller 305 may be configured to determine the type of the road on which the hybrid vehicle 300 is being driven based on a map table that includes the type of the road according to the average speed of the hybrid vehicle. For example, the road type may be a street, an arterial, or an expressway. The map table may include the road type that corresponds to the average speed (or an average value of the vehicle speed), an average value of an acceleration pedal position sensor (APS) value, or an average value of a brake pedal position sensor (BPS) value (or a combination of the average value of the vehicle speed, the average value of the APS value, and the average value of the BPS value). The map table may be generated by a test.

For example, the controller 305 may be one or more microprocessors operated by a program or hardware including the microprocessor. The program may include a series of commands for executing the method for controlling driving of the hybrid vehicle according to the exemplary embodiment of the present invention. The hybrid vehicle 300 may include the controller 305, an engine 310, a hybrid starter-generator (HSG) 320, an engine clutch 325, a motor (or a driving motor) 330 which may be an electric motor, a battery 340, a transmission 350, and wheels (or driving wheels) 390. The controller 305 may be configured to operate the other components of the vehicle 300.

The hybrid vehicle 300, which is a hybrid electric vehicle, may use the engine 310 and the motor 330 as power sources, and may include the engine clutch 325 disposed between the engine 310 and the motor 330 and thus, the hybrid vehicle 300 may be operated in an electric vehicle (EV) mode in which the hybrid vehicle 300 travels by the motor 330 when the engine clutch 325 is opened, and in a hybrid electric vehicle (HEV) mode in which the hybrid vehicle 300 is capable of travelling by both the motor 330 and the engine 310 when the engine clutch 325 is closed.

The hybrid vehicle 300 may include a power train of a transmission mounted electric device (TMED) type in which the motor 330 is connected to the transmission 350. The hybrid vehicle 300 may be driven in various driving modes, such as the EV mode, which is the electric vehicle mode using power of the motor, and the HEV mode, which uses rotational force of the engine as main power and uses rotational force of the motor as auxiliary power based on whether the engine clutch 325 disposed between the engine 310 and the motor 330 is engaged (or connected). In particular, in the hybrid vehicle 300 including a structure in which the motor 330 may be directly connected to the transmission 350, revolutions per minute (RPM) of the engine may be increased by operation of the HSG 320, power delivery and power cutoff between the engine and the motor may be performed via engagement and release of the clutch 325, a driving force may be transmitted (or transferred) to the wheels 390 through a power transmission system which may include the transmission 350, and torque of the engine may be transmitted to the motor via engagement of the clutch 325 when transmission of the engine torque is requested.

The controller 305 may include a hybrid control unit (HCU), a motor control unit (MCU), an engine control unit (ECU), and a transmission control unit (TCU). The HCU may be configured to start the engine 310 by operating the HSG 320 when the engine stops. The HCU may be a highest controller or an upper controller, and may be configured to operate the controllers (e.g., the MCU) connected via a network such as a controller area network (CAN) which is a vehicle network, and may be configured to execute overall operation of the hybrid vehicle 300.

The MCU may be configured to operate the HSG 320 and the motor 330. The MCU may be configured to adjust an output torque of the driving motor 330 via the network based on the control signal output from the HCU, and thus may be configured to operate the motor at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter may be configured to convert a direct current (DC) voltage supplied from the battery 340 into a three-phase alternating current (AC) voltage to drive the driving motor 330. The MCU may be disposed between the battery 340 and the motor 330.

The ECU may be configured to adjust a torque of the engine 310. In particular, the ECU may be configured to adjust an operating point (or a driving point) of the engine 310 via the network based on a control signal output from the HCU, and may be configured to operate the engine to output an optimal torque. The TCU may be configured to operate the transmission 350. The engine 310 may include a diesel engine, a gasoline engine, a liquefied natural gas (LNG) engine, or a liquefied petroleum gas (LPG) engine, and may output a torque at the operating point based on a control signal output from the ECU. The torque may be combined with driving force of the driving motor 330 in the HEV mode. The engine 310 may be connected to the motor 330 via the engine clutch 325 to generate a power transmitted to the transmission 350.

The HSG 320 may operate as a motor based on a control signal output from the MCU to start the engine 310, and may operate as a generator when start of the engine 310 is maintained to provide generated electric power to the battery 340 via the inverter. The HSG 320 may be connected to the engine 310 via a belt. The HSG 320, which is a motor that cranks the engine, may be directly connected to the engine. The engine clutch 325 may be disposed (or mounted) between the engine 310 and the driving motor 330, and may be operated to switch power delivery between the engine 310 and the motor 330. The engine clutch 325 may connect or intercept power between the engine and the motor based on switching of the HEV mode and the EV mode. Operation of the engine clutch 325 may be adjusted by the controller 305.

The motor 330 may be operated by a three-phase AC voltage output from the MCU to generate a torque. The motor 330 may be operated as a generator during coasting drive or regenerative braking to supply a voltage (or regenerative energy) to the battery 340. The battery 340 may include a plurality of unit cells. A high voltage for providing a driving voltage (e.g., about 350-450 V DC) to the motor 330 that provides driving power to the wheels 390 or the HSG 320 may be stored in the battery 340.

The transmission 350 may include a multiple speed transmission, such as an automatic transmission or a dual clutch transmission (DCT), or a continuously variable transmission (CVT), and may shift to a desired gear using hydraulic pressure based on control of the TCU to operate engagement elements and disengagement elements. The transmission 350 may be configured to transmit driving force of the engine 310 and/or the motor 330 to the wheels 390, and may intercept power delivery between the motor 330 (or the engine 310) and the wheels 390.

According to a determination step 105, the controller 305 may be configured to determine whether the determined type of the road is the street in a downtown (e.g., a more congested area). In particular, the street type may be detected based on the map table (e.g., a memory) that includes driving environment based on the average speed of the vehicle. For example, when the average vehicle speed is less than a predetermined speed, the controller may be configured to determine that the vehicle is being driven in a highly congested area, that is, a downtown street. The method for controlling driving of the hybrid vehicle may continue to a determination step 110 when the determined type of the road is the street. The process may then proceed to a determination step 135 when the determined type of the road is not the street (e.g., the average speed is determined to be greater than the predetermined speed).

According to the determination step 110, the controller 305 may be configured to detect whether the hybrid vehicle 300 is stopped or decelerated to a specific speed using a signal output from a speed sensor of the hybrid vehicle. For example, determining whether the hybrid vehicle 300 is stopped or decelerated to the specific speed may be performed by calculating a moving average in real time by continuously collecting vehicle speed data during a predetermined time interval. According to a determination step 115, when the hybrid vehicle 300 is stopped or decelerated to the specific speed, the controller 305 may be configured to determine whether a slope of the road on which the hybrid vehicle is being driven is less than or equal to a threshold value. In particular, to prevent degradation of driving responsiveness, the exemplary embodiment of the present invention may determine the slope of the road. Thus, when an uphill road having a slope greater than the threshold value is detected, the method for controlling driving of the hybrid vehicle according to the exemplary embodiment may not be performed in the street.

According to a calculation step 120, when the slope of the road on which the hybrid vehicle 300 is being driven is less than or equal to the threshold value, the controller 305 may be configured to calculate a change rate of the vehicle speed and a change rate of the acceleration pedal position sensor (APS) value during a specific driving time of the hybrid vehicle. According to a determination step 125, the controller 305 may be configured to determine whether acceleration of the hybrid vehicle shown in FIG. 3 is predicted based on the change rate of the vehicle speed and the change rate of the APS value. For example, the controller 305 may be configured to determine that the acceleration of the hybrid vehicle is predicted when the change rate of the vehicle speed is greater than a reference value and the change rate of the APS value is greater than a reference value.

According to an adjustment step 130, when the acceleration of the hybrid vehicle 300 is predicted and a state of charge (SOC) of the battery 340 is equal to or greater than a threshold value for performing the predicted acceleration, the controller 305 may be configured to increase the conversion reference value for converting the driving mode of the hybrid vehicle from the EV mode to the HEV mode, as shown in FIG. 4. Reference numeral 15 in FIG. 4 may indicate the conversion reference value. The hybrid vehicle 300 may enter the HEV mode when the hybrid vehicle operates in a region that is equal to or greater than the conversion reference value, and the hybrid vehicle 300 may enter the EV mode when the hybrid vehicle 300 operates in a region that is less than the conversion reference value.

Further, the controller 305 may be configured to operate the hybrid vehicle 300 in the EV mode after the conversion reference value is increased (or adjusted). For example, the conversion reference value may be the speed of the vehicle, a torque required by a driver of the vehicle, or a power required by the driver. According to a determination step 135, the controller 305 may be configured to determine whether the determined road type is an expressway, highway, interstate, or the like. In particular, the expressway may be detected or confirmed based on the map table that includes the driving environment according to the average speed of the vehicle.

The process may proceed to a determination step 140 when the determined road type is detected as the expressway. The process may proceed to the determination step 105 when the determined road type is not detected to be the expressway. According to the determination step 140, the controller 305 may be configured to determine whether the hybrid vehicle 300 stops or decelerates to a specific speed using the signal output from the speed sensor. For example, determining whether the hybrid vehicle 300 stops or decelerates to the specific speed may be performed by calculating a moving average calculated in real time by continuously collecting vehicle speed data during a predetermined time interval.

According to a determination step 145, when the hybrid vehicle 300 stops or decelerates to the specific speed, the controller 305 may be configured to determine whether a slope of the road on which the hybrid vehicle is being driven is less than or equal to a threshold value. In particular, to prevent degradation of driving responsiveness, the exemplary embodiment of the present invention may determine the slope of the road. Thus, when an uphill road having a slope greater than the threshold value is detected, the method for controlling driving of the hybrid vehicle according to the exemplary embodiment may not be performed in the expressway.

According to a calculation step 150, when the slope of the road on which the hybrid vehicle 300 is being driven is less than or equal to the threshold value, the controller 305 may be configured to calculate a change rate of the vehicle speed and a change rate of the acceleration pedal position sensor (APS) value during a specific driving time of the hybrid vehicle. According to a determination step 155, the controller 305 may be configured to determine whether acceleration of the hybrid vehicle shown in FIG. 3 is predicted based on the change rate of the vehicle speed and the change rate of the APS value. For example, the controller 305 may be configured to determine that the acceleration of the hybrid vehicle is predicted when the change rate of the vehicle speed is greater than a reference value and the change rate of the APS value is greater than a reference value.

According to an adjustment step 160, when the acceleration of the hybrid vehicle 300 is predicted and the SOC of the battery 340 is equal to or greater than the threshold value for performing the predicted acceleration, the controller 305 may be configured to increase the conversion reference value for converting the driving mode of the hybrid vehicle from the EV mode to the HEV mode, as shown in FIG. 4. After the conversion reference value is increased, the controller 305 may be configured to operate the hybrid vehicle 300 in the EV mode.

As described above, the exemplary embodiment of the present invention may classify the acceleration pattern of the vehicle into driving on the street and driving of the expressway to thus control driving of the hybrid vehicle that is suddenly started or accelerated. After the acceleration pattern is classified, the conversion reference value that changes based on the SOC of the battery 340 may be increased for a predetermined time interval, as shown in FIG. 4.

Figure 6:
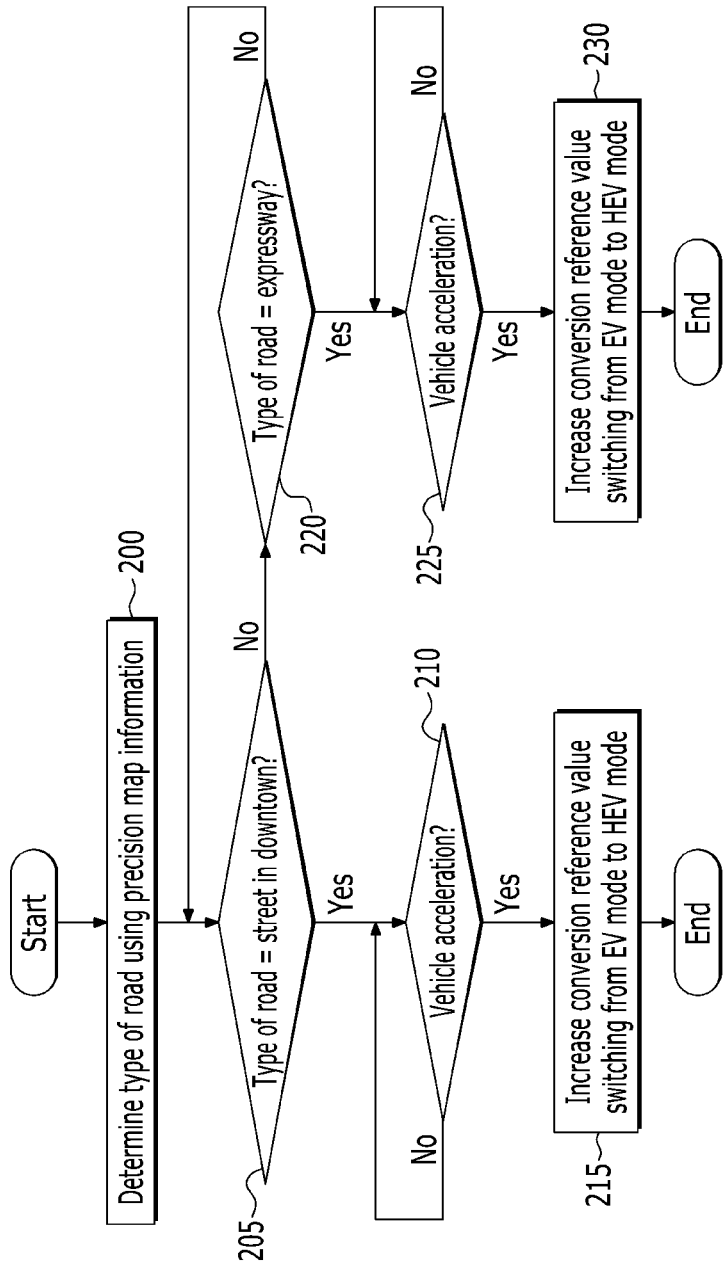
FIG. 6 is a flowchart illustrating the method for controlling driving of the hybrid vehicle according to another exemplary embodiment of the present invention.

FIG. 6 is a flowchart illustrating the method for controlling driving of the hybrid vehicle according to another exemplary embodiment of the present invention. Referring to FIGS. 3, 4, 6, and 7, in a determination step 200, the controller 305 may be configured to determine a type of a road on which the hybrid vehicle 300 is being driven based on precision map information (or precise road map information). The precision map may represent a three-dimensional (3D) map which has high accuracy information on the road and geographical features around the road.

According to a determination step 205, the controller 305 may be configured to determine whether the determined type of the road is the street in a downtown area. In particular, the street may be confirmed or detected based on the precision map information. The method for controlling driving of the hybrid vehicle may proceed to a determination step 210 when the determined type of the road is the street. The process may then proceed to a determination step 220 when the determined type of the road is not the street (e.g., based on a detected vehicle speed).

According to the determination step 210, the controller 305 may be configured to determine whether acceleration of the hybrid vehicle shown in FIG. 3 is predicted based on traffic signal information or the precision map information received at the hybrid vehicle 300. The traffic signal information or the precision map information may be transmitted from a server extraneous to the vehicle. For example, the traffic signal information may include traffic signal change information such as information indicating a switch from a red traffic light to a green traffic light, and the precision map information may include speed hump position information. An acceleration state of the hybrid vehicle may include an acceleration state of the vehicle occurring after the vehicle stops in front of a crossroad or an acceleration state of the vehicle occurring after the vehicle passes through a speed hump.

According to an adjustment step 215, when the acceleration of the hybrid vehicle 300 is predicted and the SOC of the battery 340 is equal to or greater than a threshold value for performing the predicted acceleration, the controller 305 may be configured to increase the conversion reference value for converting the driving mode of the hybrid vehicle from the EV mode to the HEV mode, as shown in FIG. 4. The controller 305 may be configured to operate the hybrid vehicle 300 in the EV mode after the conversion reference value is increased (or adjusted). According to a determination step 220, the controller 305 may be configured to determine whether the determined road type is the expressway. In particular, the expressway may be detected based on the precision map information. The process may then proceed to a determination step 225 when the determined road type is the expressway. The process may proceed to the determination step 205 when the determined road type is not the expressway.

According to the determination step 225, the controller 305 may be configured to determine whether acceleration of the hybrid vehicle shown in FIG. 3 is predicted based on the precision map information received at the hybrid vehicle 300. For example, the precision map information may include toll gate location information or interchange (IC) location information. An acceleration state of the hybrid vehicle may include an acceleration state of the vehicle occurring after the vehicle passes through an interchange or an acceleration state of the vehicle occurring after the vehicle passes through a speed hump.

According to an adjustment step 230, when the acceleration of the hybrid vehicle 300 is predicted and the SOC of the battery 340 is equal to or greater than the threshold value for performing the predicted acceleration, the controller 305 may be configured to increase the conversion reference value for converting the driving mode of the hybrid vehicle from the EV mode to the HEV mode, as shown in FIG. 4. After the conversion reference value is increased, the controller 305 may be configured to operate the hybrid vehicle 300 in the EV mode.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

305: controller 310: engine 330: motor 340: battery

What is claimed is:

1. A method for controlling driving of a hybrid vehicle, comprising:
   determining, by a controller, whether acceleration of the hybrid vehicle is predicted;
   increasing, by the controller, a conversion reference value that converts a driving mode of the hybrid vehicle from an electric vehicle (EV) mode to a hybrid electric vehicle (HEV) mode when acceleration of the hybrid vehicle is predicted; and
   operating, by the controller, the vehicle in the EV mode after the conversion reference value is increased,
   wherein the controller is configured to determine whether acceleration of the hybrid vehicle is predicted based on a change rate of speed of the vehicle and a change rate of an acceleration pedal position sensor (APS) value that are generated during a predetermined driving time of the vehicle after the hybrid vehicle stops or decelerates to a predetermined speed.

2. The method of claim 1, further comprising:
   determining, by the controller, whether a slope of a road on which the vehicle is being driven is less than or equal to a threshold value,
   wherein the controller is configured to predict acceleration of the vehicle when the slope is less than or equal to the threshold value.

3. The method of claim 1, further comprising:
   determining, by the controller, a type of a road on which the vehicle is being driven based on an average speed of the vehicle,
   wherein the controller is configured to predict acceleration of the vehicle when the type of the road is determined as a street in a downtown area.

4. The method of claim 1, further comprising:
   determining, by the controller, a type of a road on which the vehicle is being driven based on an average speed of the vehicle,
   wherein the controller is configured to predict acceleration of the vehicle when the type of the road is determined as an expressway.

5. A method for controlling driving of a hybrid vehicle, comprising:
   determining, by a controller, whether acceleration of the hybrid vehicle is predicted;
   increasing, by the controller, a conversion reference value that converts a driving mode of the hybrid vehicle from an electric vehicle (EV) mode to a hybrid electric vehicle (HEV) mode when acceleration of the hybrid vehicle is predicted; and
   operating, by the controller, the vehicle in the EV mode after the conversion reference value is increased,
   wherein the controller is configured to determine whether acceleration of the hybrid vehicle is predicted based on traffic signal information or precision map information received by the vehicle.

6. The method of claim 5, further comprising:
   determining, by the controller, a type of a road on which the vehicle is being driven based on precision map information,
   wherein the controller is configured to predict acceleration of the vehicle when the type of the road is determined as a street in a downtown area.

7. The method of claim 5, further comprising:
   determining, by the controller, a type of a road on which the vehicle is being driven based on precision map information,
   wherein the controller is configured to predict acceleration of the vehicle when the type of the road is determined as an expressway.

8. A system for controlling driving of a hybrid vehicle, comprising:
   a memory configured to store program instructions; and
   a processor configured to execute the program instructions, the program instructions when executed configured to:
   determine whether acceleration of the hybrid vehicle is predicted; and
   increase a conversion reference value converting a driving mode of the hybrid vehicle from an electric vehicle (EV) mode to a hybrid electric vehicle (HEV) mode when acceleration of the hybrid vehicle is predicted,
   wherein the program instructions when executed are further configured to operate the vehicle in the EV mode after the conversion reference value is increased, and
   wherein the program instructions when executed are further configured to determine whether acceleration of the hybrid vehicle is predicted based on a change rate of speed of the vehicle and a change rate of an acceleration pedal position sensor (APS) value that are generated during a predetermined driving time of the vehicle after the hybrid vehicle stops or decelerates to a predetermined speed.

9. The system of claim 8, wherein the program instructions when executed are further configured to:
   determine whether a slope of a road on which the vehicle is being driven is less than or equal to a threshold value; and
   predict acceleration of the vehicle when the slope is less than or equal to the threshold value.

10. The system of claim 8, wherein the program instructions when executed are further configured to:
    determine a type of a road on which the vehicle is being driven based on an average speed of the vehicle; and
    predict acceleration of the vehicle when the type of the road is determined as a street in a downtown area.

11. The system of claim 8, wherein the program instructions when executed are further configured to:
    determine a type of a road on which the vehicle is being driven based on an average speed of the vehicle; and
    predict acceleration of the vehicle when the type of the road is determined as an expressway.

12. A system for controlling driving of a hybrid vehicle, comprising:
    a memory configured to store program instructions; and a processor configured to execute the program instructions, the program instructions when executed configured to:
  determine whether acceleration of the hybrid vehicle is predicted; and
  increase a conversion reference value converting a driving mode of the hybrid vehicle from an electric vehicle (EV) mode to a hybrid electric vehicle (HEV) mode when acceleration of the hybrid vehicle is predicted,
wherein the program instructions when executed are further configured to operate the vehicle in the EV mode after the conversion reference value is increased, and
wherein the program instructions when executed are further configured to determine whether acceleration of the hybrid vehicle is predicted based on traffic signal information or precision map information received by the vehicle.

13. The system of claim 12, wherein the program instructions when executed are further configured to:
  determine a type of a road on which the vehicle is being driven based on precision map information; and
  predict acceleration of the vehicle when the type of the road is determined as a street in a downtown area.

14. The system of claim 12, wherein the program instructions when executed are further configured to:
  determine a type of a road on which the vehicle is being driven based on precision map information; and
  predict acceleration of the vehicle when the type of the road is determined as an expressway.

* * * * *